(12) United States Patent
Miyama et al.

(10) Patent No.: US 9,425,673 B2
(45) Date of Patent: Aug. 23, 2016

(54) MECHANICALLY AND ELECTRICALLY INTEGRATED MODULE

(71) Applicants: Yoshihiro Miyama, Chiyoda-ku (JP); Moriyuki Hazeyama, Chiyoda-ku (JP)

(72) Inventors: Yoshihiro Miyama, Chiyoda-ku (JP); Moriyuki Hazeyama, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 182 days.

(21) Appl. No.: 14/375,625

(22) PCT Filed: Feb. 4, 2013

(86) PCT No.: PCT/JP2013/052449
§ 371 (c)(1),
(2) Date: Jul. 30, 2014

(87) PCT Pub. No.: WO2013/118670
PCT Pub. Date: Aug. 15, 2013

(65) Prior Publication Data
US 2015/0001972 A1    Jan. 1, 2015

(30) Foreign Application Priority Data

Feb. 6, 2012   (JP) ................... 2012-022873

(51) Int. Cl.
*H02K 11/00* (2016.01)
*H02K 5/24* (2006.01)
*H02K 9/00* (2006.01)
*H02M 7/00* (2006.01)

(52) U.S. Cl.
CPC ............. *H02K 11/0073* (2013.01); *H02K 5/24* (2013.01); *H02K 9/005* (2013.01); *H02K 11/33* (2016.01); *H02K 2213/03* (2013.01); *H02M 7/003* (2013.01)

(58) Field of Classification Search
CPC ............ H02K 5/10; H02K 5/15; H02K 5/24; H02K 5/225
USPC .................................... 310/68 C, 71, 88, 89
See application file for complete search history.

(56) References Cited

U.S. PATENT DOCUMENTS

| 5,373,208 A | 12/1994 | Ichimura et al. |
| 8,916,999 B2 * | 12/2014 | Imai ..................... H02K 1/2746 310/156.45 |
| 2002/0175574 A1 | 11/2002 | Okazaki et al. |

(Continued)

FOREIGN PATENT DOCUMENTS

| JP | 6-17355 | 3/1994 |
| JP | 6-169551 | 6/1994 |

(Continued)

OTHER PUBLICATIONS

International Search Report issued Apr. 9, 2013, in PCT/JP2013/052449, filed Feb. 4, 2013.

*Primary Examiner* — Hanh Nguyen
(74) *Attorney, Agent, or Firm* — Oblon, McClelland, Maier & Neustadt, L.L.P.

(57) ABSTRACT

A non-load-end end frame is housed and held in a non-load-end end-frame-holding portion of a frame in an internally fitted state, and recessed grooves that have groove directions in an axial direction are recessed into an outer circumferential surface of the non-load-end end frame. A stator coil and alternating-current terminals of an inverter apparatus are connected using connecting conductors that are passed through the recessed grooves.

11 Claims, 10 Drawing Sheets

(56) References Cited

U.S. PATENT DOCUMENTS

| | | | |
|---|---|---|---|
| 2005/0206254 A1* | 9/2005 | Tsuge | H02K 5/1735 310/68 B |
| 2007/0182265 A1* | 8/2007 | Makino | H02K 3/522 310/179 |
| 2008/0122304 A1* | 5/2008 | Makino | H02K 3/522 310/71 |

FOREIGN PATENT DOCUMENTS

| | | |
|---|---|---|
| JP | 2002-354755 | 12/2002 |
| JP | 2003-274606 | 9/2003 |
| JP | 2004-201462 | 7/2004 |
| JP | 2005-117708 | 4/2005 |
| JP | 2006-197781 | 7/2006 |

* cited by examiner

MECHANICALLY AND ELECTRICALLY INTEGRATED MODULE

TECHNICAL FIELD

The present invention relates to a mechanically and electrically integrated module in which an inverter apparatus is disposed at a non-load axial end of a rotary electric machine on an opposite side of a non-load-end end frame that incorporates a cooling flow channel, and particularly relates to an electrical wiring construction between the rotary electric machine and the inverter apparatus.

BACKGROUND ART

Conventional electric motor-integrated inverter apparatuses are configured such that an inverter apparatus that converts direct-current power and alternating-current power bidirectionally is disposed at a non-load axial end of an alternating-current motor (see Patent Literature 1, for example).

In conventional electric motor-integrated inverter apparatuses, because a rear frame on which a cooling flow channel is formed is interposed between the inverter apparatus and the alternating-current motor, a penetrating aperture has been formed so as to pass axially through the rear frame so as to avoid the cooling flow channel, and connecting conductors have been passed through that penetrating aperture to connect a stator coil of the alternating-current motor electrically to the alternating-current terminals of the inverter apparatus.

CITATION LIST

Patent Literature

Patent Literature 1: Japanese Patent Laid-Open No. 2004-201462 (Gazette)

SUMMARY OF THE INVENTION

Problem to be Solved by the Invention

In conventional electric motor-integrated inverter apparatuses, it is necessary to pass the connecting conductors that electrically connect the alternating-current terminals of the inverter apparatus and the stator coil of the alternating-current motor through the penetrating aperture that is formed on the rear frame. In addition, since the circumferential and radial positions of the alternating-current terminals of the inverter apparatus and the stator coil of the alternating-current motor are different, the connecting conductors must be led not only axially but also circumferentially and radially to pass through the penetrating aperture. Thus, in conventional electric motor-integrated inverter apparatuses, one problem has been that a connecting operation between the alternating-current terminals of the inverter apparatus and the stator coil of the alternating-current motor is complicated.

Generally, in electric automobile drive motors, axial length is long, and a cross-sectional area that is perpendicular to the axial direction is small. Thus, when electric automobile drive motors and inverter apparatuses are integrated, packing density of the inverter elements is high, and the cooling flow channel is also complicated, preventing a large-diameter penetrating aperture from being opened. In addition, in electric automobile drive motors, because large currents flow through the stator coil, the connecting conductors are thick, and are difficult to bend. Consequently, when conventional electric motor-integrated inverter apparatuses are used in electric automobiles, the above problems are exacerbated.

The present invention aims to solve the above problems and an object of the present invention is to provide a mechanically and electrically integrated module in which a connecting operation between an alternating-current terminal of a power module and a stator coil of a rotary electric machine is facilitated.

Means for Solving the Problem

In order to achieve the above object, according to one aspect of the present invention, there is provided a mechanically and electrically integrated module including: a rotary electric machine that includes: a housing that includes: a cylindrical frame; a load-end end frame that is disposed on a first axial end of the frame; and a non-load-end end frame that is disposed on a second axial end of the frame, and into which a cooling flow channel is built; a stator that includes: an annular stator core that is housed and held in the frame in an internally fitted state; and a stator coil that is mounted onto the stator core; and a rotor that is rotatably supported by the load-end end frame and the non-load-end end frame so as to be disposed on an inner circumferential side of the stator; and an inverter apparatus that includes: power modules that are disposed on an opposite side of the non-load-end end frame from the load-end end frame; and a power-module-driving circuit. The frame includes: a non-load-end end-frame-holding portion that is formed by enlarging an inside diameter of a non-load-end end portion thereof, and that houses and holds the non-load-end end frame in an internally fitted state; and a stator-core-holding portion that is formed at a load end of the non-load-end end-frame-holding portion so as to have a smaller diameter than the non-load-end end-frame-holding portion, and that houses and holds the stator core in an internally fitted state. A recessed groove that has a groove direction in an axial direction is recessed into at least one of an outer circumferential surface of the non-load-end end frame and an inner circumferential surface of the non-load-end end-frame-holding portion, and the stator coil and an alternating-current terminal of the inverter apparatus are connected by a connecting conductor that is passed through the recessed groove.

Effects of the Invention

According to the present invention, because a recessed groove is recessed into at least one of an outer circumferential surface of the non-load-end end frame and an inner circumferential surface of the non-load-end end-frame-holding portion, cross-sectional area of the recessed groove can be enlarged, facilitating passage of the connecting conductor. In addition, the non-load-end end frame can be housed in the non-load-end end-frame-holding portion in an internally fitted state with the connecting conductor passed through the recessed groove. Thus, complicated operations such as passing the connecting conductor through a penetrating aperture that has a small diameter are no longer required, facilitating the connecting operation between the alternating-current terminals of the inverter apparatus and the stator coil of the motor.

DESCRIPTION OF EMBODIMENTS

Preferred embodiments of a mechanically and electrically integrated module according to the present invention will now be explained with reference to the drawings.

Embodiment 1

Figure 1:
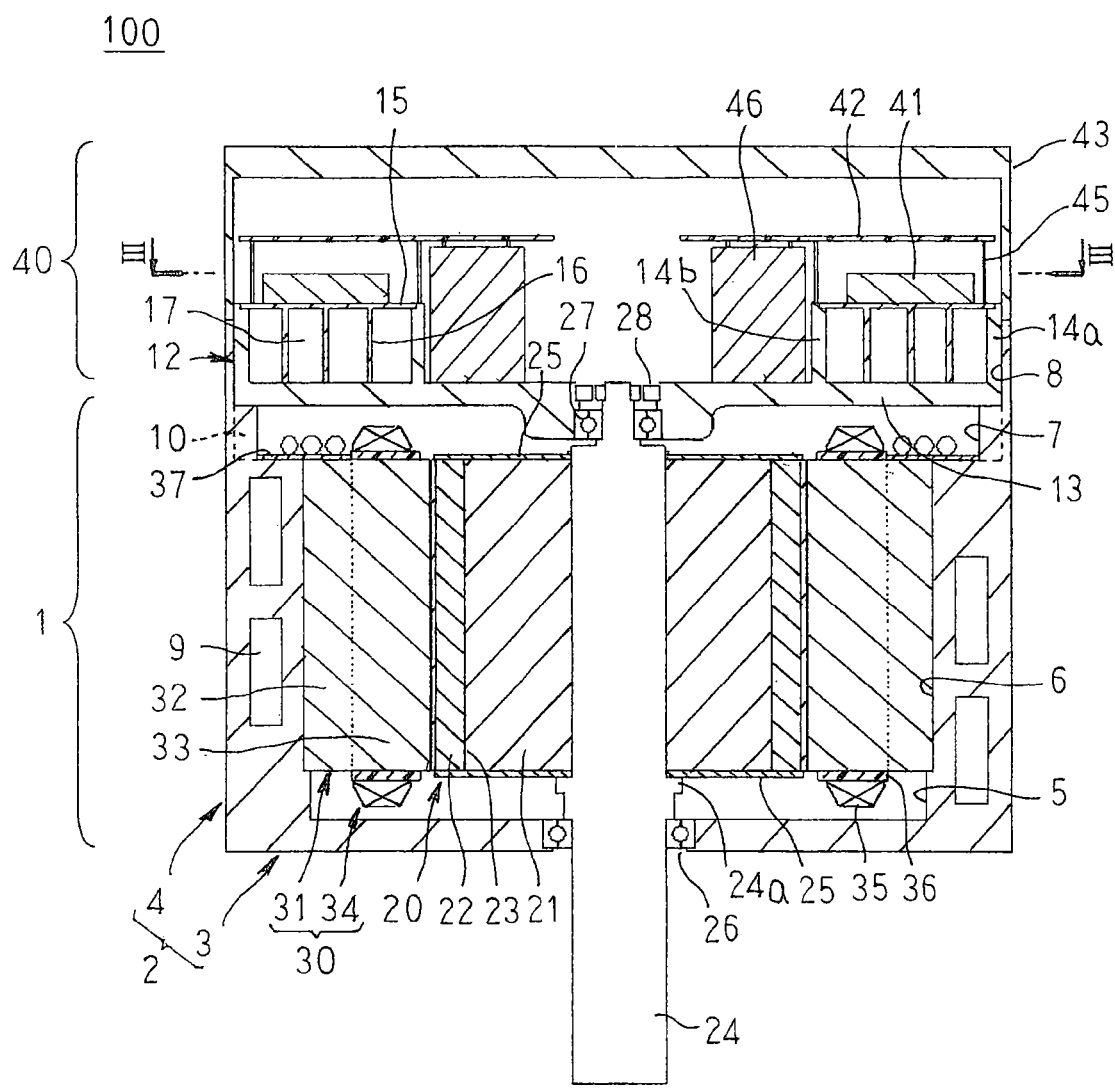
FIG. 1 is a cross section that shows a mechanically and electrically integrated module according to Embodiment 1 of the present invention.
Figure 2:
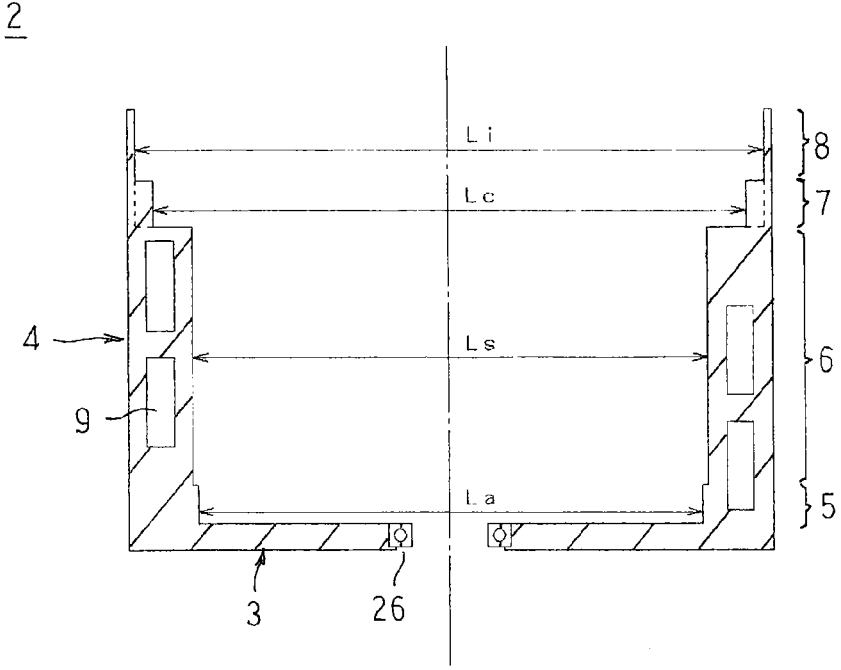
FIG. 2 is a cross section that shows a motor frame that is used in the mechanically and electrically integrated module according to Embodiment 1 of the present invention.
Figure 3:
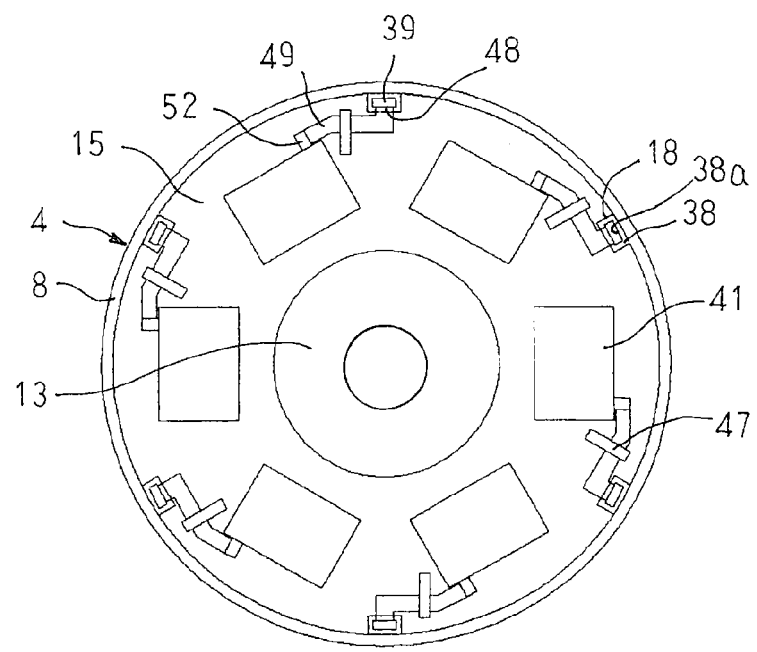
FIG. 3 is a cross section that is taken along Line III-III in FIG. 1 so as to be viewed in the direction of the arrows.
Figure 4:
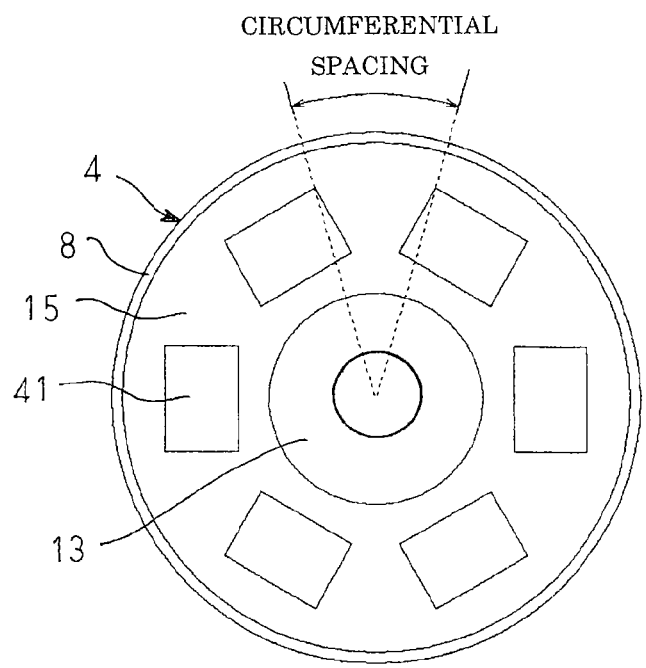
FIG. 4 is a top plan that explains limits of circumferential spacing between power modules in the mechanically and electrically integrated module according to Embodiment 1 of the present invention.
Figure 5:
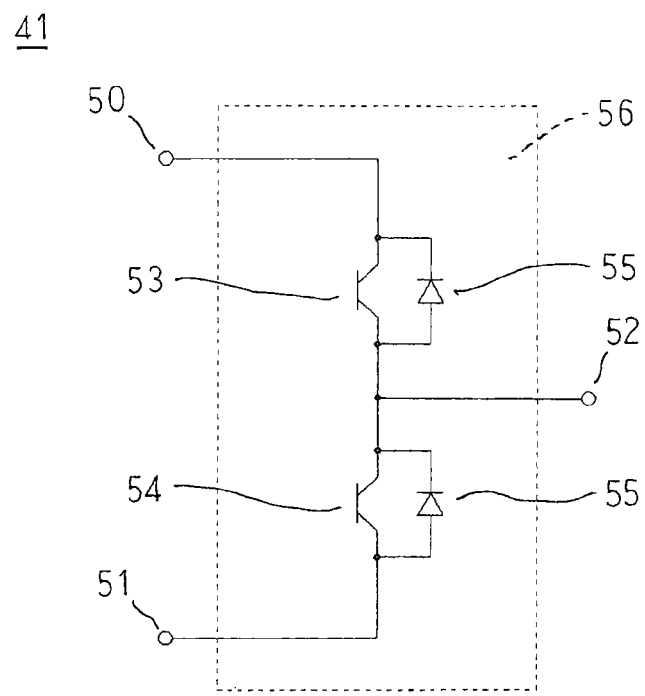
FIG. 5 is a schematic diagram that explains a configuration of a module that is used in the mechanically and electrically integrated module according to Embodiment 1 of the present invention.
Figure 6:
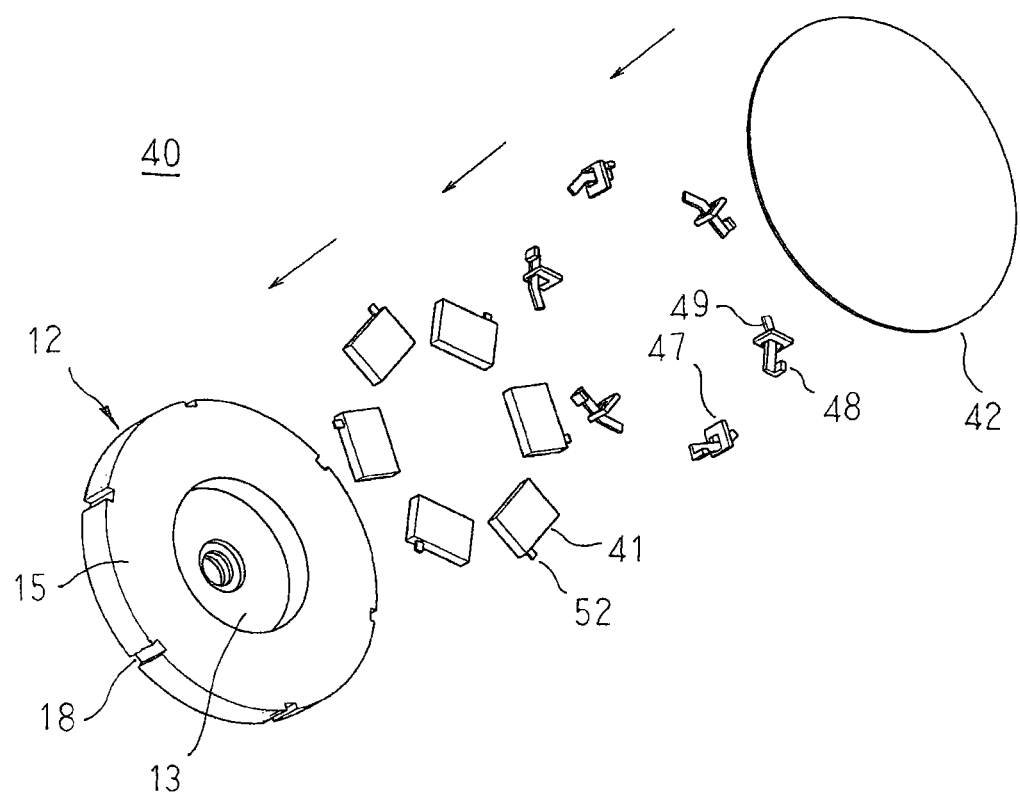
FIG. 6 is an exploded oblique projection that explains a method for assembling an inverter apparatus in the mechanically and electrically integrated module according to Embodiment 1 of the present invention.
Figure 7:
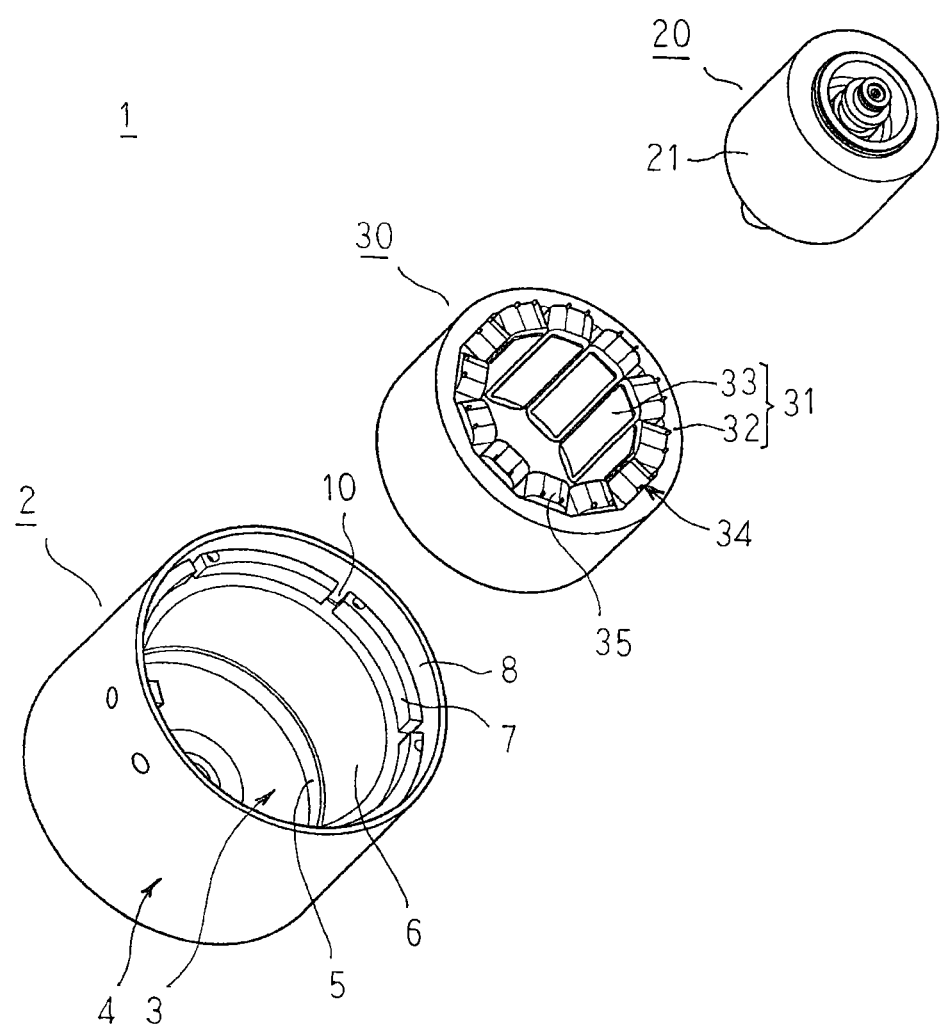
FIG. 7 is an exploded oblique projection that explains a method for assembling a motor in the mechanically and electrically integrated module according to Embodiment 1 of the present invention.
Figure 8:
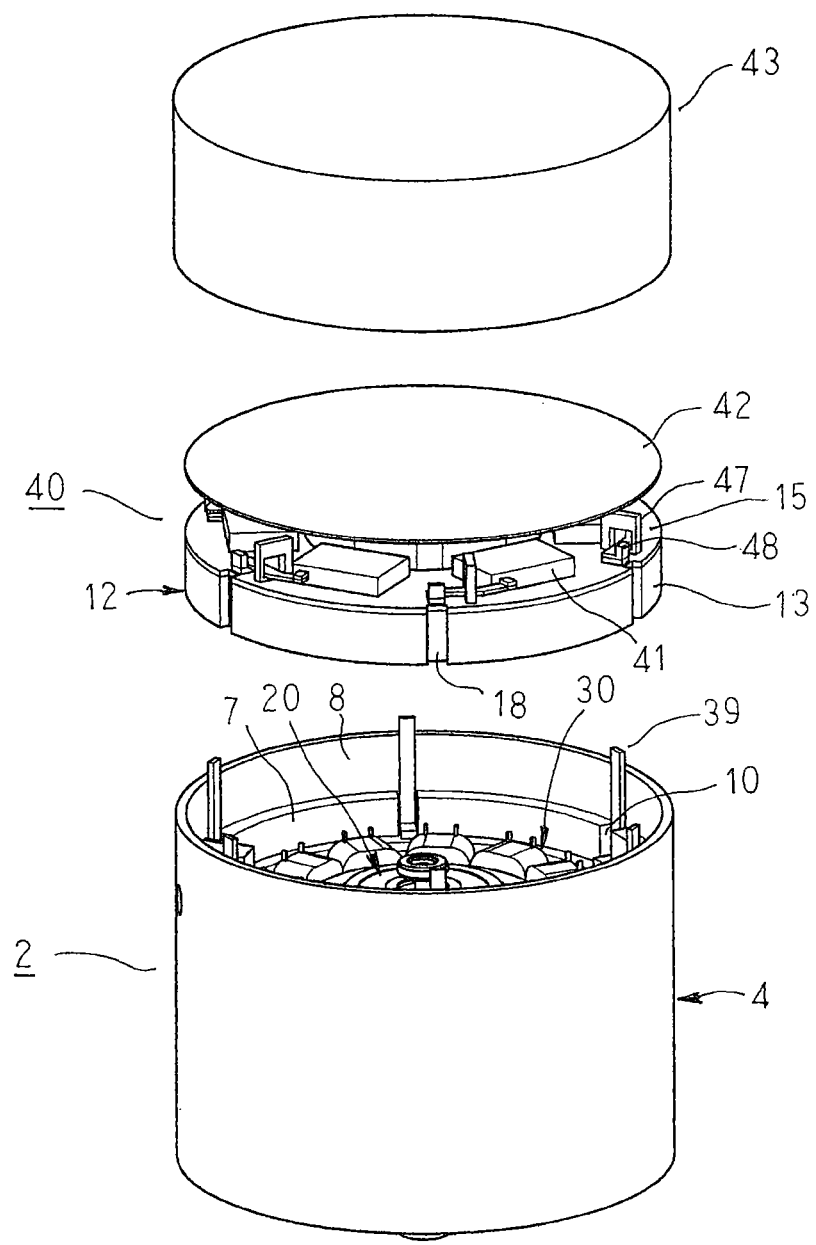
FIG. 8 is an exploded oblique projection that explains a method for assembling the mechanically and electrically integrated module according to Embodiment 1 of the present invention.

FIG. 1 is a cross section that shows a mechanically and electrically integrated module according to Embodiment 1 of the present invention, FIG. 2 is a cross section that shows a motor frame that is used in the mechanically and electrically integrated module according to Embodiment 1 of the present invention, FIG. 3 is a cross section that is taken along Line III-III in FIG. 1 so as to be viewed in the direction of the arrows, FIG. 4 is a top plan that explains limits of circumferential spacing between power modules in the mechanically and electrically integrated module according to Embodiment 1 of the present invention, FIG. 5 is a schematic diagram that explains a configuration of a module that is used in the mechanically and electrically integrated module according to Embodiment 1 of the present invention, FIG. 6 is an exploded oblique projection that explains a method for assembling an inverter apparatus in the mechanically and electrically integrated module according to Embodiment 1 of the present invention, FIG. 7 is an exploded oblique projection that explains a method for assembling a motor in the mechanically and electrically integrated module according to Embodiment 1 of the present invention, and FIG. 8 is an exploded oblique projection that explains a method for assembling the mechanically and electrically integrated module according to Embodiment 1 of the present invention. Moreover, to facilitate explanation, a capacitor and circuit board supports are omitted from FIGS. 3 and 6.

In FIG. 1, a mechanically and electrically integrated module 100 has: a motor 1 that functions as a rotary electric machine; and an inverter apparatus 40 that converts direct-current power that is supplied from an external portion into alternating-current power and supplies the alternating-current power to the motor 1, and is configured such that the inverter apparatus 40 is incorporated integrally into a non-load end of the motor 1.

The motor 1 includes: a motor frame 2; a non-load-end end frame 12; a rotor 20 that is rotatably disposed inside a housing that is constituted by the motor frame 2 and the non-load-end end frame 12; and a stator 30 that is mounted onto the motor frame 2 so as to surround the rotor 20.

As shown in FIG. 2, the motor frame 2 is produced into a floored cylindrical shape that has: a disk-shaped load-end end frame 3; and a cylindrical frame 4 that is disposed so as to extend axially from an outer circumferential edge portion of the load-end end frame 3. A load-end bearing 26 is mounted onto a central axial position of the load-end end frame 3. The frame 4 is formed so as to have an inner circumferential surface shape in which an inside diameter increases successively in a stepped shape from near the load-end end frame 3 toward an opening side (a non-load end). Specifically, the frame 4 is configured such that a load-end coil-end-housing portion 5 that has an inside diameter La, a stator-core-holding portion 6 that has an inside diameter Ls, a non-load-end coil-end-housing portion 7 that has an inside diameter Lc, and a non-load-end end-frame-holding portion 8 that has an inside diameter Li line up sequentially from the load end toward the non-load end. A motor cooling flow channel 9 is built into the frame 4. In addition, six connecting-conductor-guiding grooves 10 are respectively recessed into an inner circumferential surface of the non-load-end coil-end-housing portion 7 so as to have groove directions oriented in an axial direction and so as to be arranged in a row at a uniform angular pitch circumferentially.

Here, the load-end coil-end-housing portion 5 has an axial length that is slightly longer than an axial length of load-end coil ends of a stator coil 34. The stator-core-holding portion 6 has an axial length that is approximately equal to an axial length of a stator core 31. The non-load-end coil-end-housing portion 7 has an axial length that is longer than an axial length of non-load-end coil ends of the stator coil 34. In addition, the non-load-end end-frame-holding portion 8 has an axial length that is slightly shorter than the non-load-end end frame 12. The non-load-end coil-end-housing portion 7 corresponds to an inside-diameter-expanded portion.

The load-end end frame 3 is formed integrally with the frame 4, but may be produced as a separate member from the frame 4.

The non-load-end end frame 12 includes: a base portion 13 that is produced so as to have a flat ring shape; a partitioning wall 14a that is disposed so as to stand in an annular shape on an outer circumferential edge portion of a first surface of the base portion 13 so as to have a predetermined height; a partitioning wall 14b that is disposed so as to stand concentrically on the first surface of the base portion 13 radially inside the partitioning wall 14a; a cooling frame 15 that has a first surface as a power module mounting surface; and flow channel ribs 16 that are disposed in multiple layers in a radial direction on a second surface of the cooling frame 15 so as to each extend circumferentially at a predetermined projecting height. The cooling frame 15 is integrated with the base portion 13 by joining an outer circumferential side and an inner circumferential side on the second surface of the cooling frame 15 with the partitioning walls 14a and 14b. Annular inverter-cooling flow channels 17 are thereby built into the non-load-end end frame 12. In addition, as shown in FIG. 3, six recessed grooves 18 are respectively recessed into outer circumferential surfaces of the base portion 13, the partitioning wall 14a, and the cooling frame 15 so as to have a groove direction oriented in an axial direction and so as to be arranged in a row at a uniform angular pitch circumferentially. A non-load-end bearing 27 is mounted onto the non-load-end end frame 12 at a central axial position of the base portion 13.

Moreover, the motor frame 2 and the non-load-end end frame 12 are manufactured by die casting using aluminum, for example, but the material is not limited to aluminum provided that it is a good heat-conducting metal, and the manufacturing method is also not limited to die casting.

The rotor 20 includes: a cylindrical rotor core 21 that is configured by laminating thin magnetic sheets such as electromagnetic steel sheets; ten permanent magnets 22 that are respectively housed in and fixed to each of ten magnet housing apertures 23 that are formed so as to pass axially through an outer circumferential side of the rotor core 21, and that are disposed at a uniform angular pitch circumferentially; a shaft 24 that is fixed to the rotor core 21 by being inserted so as to pass through a central position of the rotor core 21; and a pair of end plates 25 that are fixed to two axial end surfaces of the rotor core 21 to prevent dislodging of the permanent magnets 22. The permanent magnets 22 are disposed such that radially outer polarities thereof alternate circumferentially between North-seeking (N) poles and South-seeking (S) poles.

The rotor 20 is disposed rotatably inside the housing such that a second axial end portion of the shaft 24 is supported in the load-end end frame 3 by means of the load-end bearing 26, and a first axial end portion of the shaft 24 is supported in the base portion 13 of the non-load-end end frame 12 by means of the non-load-end bearing 27. The non-load-end end frame 12 is inserted into the non-load-end end-frame-holding portion 8 in an internally fitted state, and is fixed by shrinkage fitting, etc. The recessed grooves 18 axially face the connecting-conductor-guiding grooves 10 that are formed on the non-load-end end-frame-holding portion 8. In addition, a resolver 28 is mounted onto a first axial end of the shaft 24 to enable a rotational position of the rotor 20 to be detected.

The stator 30 is configured by laminating thin magnetic sheets such as electromagnetic steel sheets, and includes: the stator core 31 that has: an annular core back 32; and twelve teeth 33 that each extend radially inward from an inner circumferential surface of the core back 32, and that are arranged at a uniform angular pitch circumferentially; and the stator coil 34 that is constituted by twelve concentrated winding coils 35 that are produced by winding conductor wires that are coated with an insulator into concentrated windings on the respective teeth 33 so as to have insulators 36 interposed that are produced using an insulating material.

Here, internal connection processing (end portion processing) is applied to the stator coil 34 at the non-load end. Specifically, first end portions of each of the concentrated winding coils 35 are led out to the non-load end of the stator core 31, and six phase coils are configured by connecting pairs of circumferentially adjacent concentrated winding coils 35 in series such that winding directions are opposite. Then, two three-phase alternating current windings are each configured by wye-connecting three phase coils. In addition, connecting conductors 39 are respectively connected at second ends of the concentrated winding coils 35 that are led out to the non-load end of the stator core 31. Each of the connecting conductors 39 is bent and led around radially outward, is subsequently bent and led around to a predetermined position in the circumferential direction, and is additionally bent and led out axially at the non-load end.

The stator core 31 of the stator 30 is inserted into the stator-core-holding portion 6 of the frame 4 from the non-load end in an internally fitted state, is fixed by shrinkage fitting, etc., and is held in the motor frame 2 on an outer circumferential side of the rotor core 21 so as to be coaxial to the shaft 24. The internally connected portions (the end portion processed portions) of the stator coil 34 are held on the stator 30 and the frame 4 by means of crossover wire insulating members 37. In addition, the respective connecting conductors 39 are housed inside the connecting-conductor-guiding grooves 10, and are led out axially at the non-load end.

The motor 1 that is configured in this manner operates as a ten-pole, twelve-slot inner-rotor three-phase motor.

As shown in FIGS. 1 and 3, the inverter apparatus 40 includes: six power modules 41 that are disposed on a power module mounting surface of the cooling frame 15 at a uniform angular pitch in a circumferential direction; a power-module-driving circuit board 42 onto which a circuit that drives the power modules 41 is mounted; a protective cover 43 that is disposed so as to cover the power modules 41 and the power-module-driving circuit board 42, and that is fastened to the non-load-end end frame 12 by a screw, etc., to protect the power modules 41 and the power-module-driving circuit board 42. Moreover, each of the power modules 41 is symmetrical relative to a radius that passes through a center thereof.

As shown in FIG. 5, the power modules 41 are each constituted by: an upper arm switching element 53 in which a first end is connected to a positive electrode direct current terminal 50, and a second end is connected to a module alternating-current terminal 52; a lower arm switching element 54 of which a first end is connected to the module alternating-current terminal 52, and a second end is connected to a negative electrode direct current terminal 51; recycling diodes 55 that are respectively attached to the upper arm and lower arm switching elements 53 and 54 in parallel; and a resin-sealed portion 56 that seals them, to constitute a 2-in-1 module that correspond to conversion between direct-current power and a single phase of alternating-current power. As shown in FIG. 3, the recessed grooves 18 are positioned in circumferential spacing between pairs of circumferentially adjacent power modules 41. Here, as shown in FIG. 4, the circumferential spacing between the pairs of circumferentially adjacent power modules 41 is a region between two radii that pass through closest radially outermost portions among radially outermost portions of pairs of circumferentially adjacent power modules 41.

First ends of alternating-current conductors 49 are respectively connected to the module alternating-current terminals 52, and the alternating-current conductors 49 extend toward the recessed grooves 18 through internal portions of electric current sensors 47 that are disposed on the cooling frame 15. The connecting conductors 39 are each led out to the non-load end of the non-load-end end frame 12 so as to pass through the connecting-conductor-guiding grooves 10 and through air gaps that are formed by the non-load-end end-frame-holding portion 8 and the recessed grooves 18, and are connected to second ends of the alternating-current conductors 49. Insulating members 38 are plugged inside the air gaps that are formed between the non-load-end end-frame-holding portion 8 and the recessed grooves 18 so as to fix the connecting conductors 39 to the non-load-end end-frame-holding portion 8 or the cooling frame 15. Moreover, the insulating members 38 are formed into prisms that have a cross-sectional shape that is slightly larger than the cross-sectional shape of the air gaps that are formed by the non-load-end end-frame-holding portion 8 and the recessed grooves 18 using an insulating resin that has elasticity, such as a silicone rubber, for example, and connecting conductor insertion apertures 38a are formed at central positions thereof. The connecting conductors 39 are passed through the connecting conductor insertion apertures 38a of the insulating members 38 so as to ensure an insulated state from the frame 4 and the non-load-end end frame 12.

The power-module-driving circuit board 42 is mounted onto the cooling frame 15 by means of circuit board supports 45 so as to be disposed on a non-load side of the power modules 41. A capacitor 46 is mounted onto an inner circumferential side of the partitioning wall 14b on a non-load end of the base portion 13 so as to be connected in parallel with the power modules 41 to a direct-current (DC) busbar (not shown) on the power-module-driving circuit board 42 to which the power modules 41 are connected.

The protective cover 43 is produced so as to have a floored cylindrical shape that has an outside diameter that is approximately equal to that of the frame 4, and together with the motor frame 2, covers the entire mechanically and electrically integrated module 100.

To assemble a mechanically and electrically integrated module 100 that is configured in this manner, the six power modules 41 are first disposed on the power module mounting surface of the cooling frame 15 at a uniform angular pitch in the circumferential direction, and the electric current sensors 47 are disposed on the power module mounting surface of the cooling frame 15 in the respective circumferential spacing between the power modules 41, as shown in FIG. 6. Next, the alternating-current conductors 49 are passed through each of the electric current sensors 47, and the first ends thereof are connected to the module alternating-current terminals 52 of the power modules 41, and the second ends are connected to the alternating-current terminals 48 of the inverter apparatus 40. In addition, the power-module-driving circuit board 42 onto which the capacitor 46 is mounted is mounted onto the cooling frame 15 using the circuit board supports 45, and predetermined connection is performed to assemble the inverter apparatus 40.

Next, as shown in FIG. 7, the stator 30 is installed in the motor frame 2 by inserting the stator core 31 onto which the stator coil 34 is mounted into the stator-core-holding portion 6 of the frame 4 from the non-load end in an internally fitted state, and fixing the stator core 31 to the stator-core-holding portion 6 by shrinkage fitting, etc. Here, axial positioning of the stator 30 is achieved by the stator core 31 contacting a step between the load-end coil-end-housing portion 5 and the stator-core-holding portion 6. Next, the internal connection processing (the end portion processing) of the stator coil 34 is performed near a radially outer side of the non-load-end coil end inside the non-load-end coil-end-housing portion 7, and the six connecting conductors 39 are respectively led out axially at the non-load end through the connecting-conductor-guiding grooves 10. Moreover, the internal connection processing of the stator coil 34 may be performed before installing the stator 30 in the motor frame 2.

Next, the rotor core 21 is inserted into the stator 30 from the non-load end such that the shaft 24 is inserted into and held by the load-end bearing 26, and then the shaft 24 is pushed into the central aperture of the rotor core 21 that is held between the end plates 25. Here, axial positioning of the rotor 20 is achieved by the rotor core 21 contacting a rotor positioning step 24a of the shaft 24.

Next, as shown in FIG. 8, the non-load-end end frame 12 into which the inverter apparatus 40 has been installed is inserted into the non-load-end end-frame-holding portion 8 in an internally fitted state, and the non-load-end end frame 12 and the non-load-end end-frame-holding portion 8 are fixed by shrinkage fitting, etc. Here, a circumferential position of the non-load-end end frame 12 is adjusted such that the recessed grooves 18 face the connecting-conductor-guiding grooves 10 axially, and the non-load-end end frame 12 is inserted into the non-load-end end-frame-holding portion 8 such that the connecting conductors 39 that pass through the connecting-conductor-guiding grooves 10 and are led out axially at the non-load end are inserted into the recessed grooves 18. Then, axial positioning of the non-load-end end frame 12 is achieved by the non-load-end end frame 12 contacting a step between the non-load-end coil-end-housing portion 7 and the non-load-end end-frame-holding portion 8. In addition, the first end portion of the shaft 24 is inserted into the non-load-end bearing 27 to dispose the rotor 20 rotatably inside the housing. The resolver 28 is then mounted onto the first axial end of the shaft 24. Moreover, the connecting conductors 39 are led out to the non-load end so as to pass through the air gaps that are formed by the non-load-end end-frame-holding portion 8 and the recessed grooves 18.

Next, the insulating members 38 are pushed from the non-load end into the air gaps that are formed by the non-load-end end-frame-holding portion 8 and the recessed grooves 18 with the connecting conductors 39 passed through the connecting conductor insertion apertures 38a. The connecting conductors 39 are thereby fixed to the frame 4 or the non-load-end end frame 12 in an insulated state. Next, end portions of the connecting conductors 39 that are led out at the non-load end are cut, and the cut ends thereof are connected to the alternating-current terminals 48 by screws, etc. Next, the protective cover 43 is mounted from the non-load end so as to cover the inverter apparatus 40, and is fixed to the non-load-end end frame 12 by a screw, etc., to assemble the mechanically and electrically integrated module 100.

Although not shown, in a mechanically and electrically integrated module 100 that is assembled in this manner, direct-current (DC) wiring that supplies direct-current power from an external portion to the inverter apparatus 40, and a signal wire that communicates driving commands to the inverter apparatus 40, are led out of the protective cover 43, and are connected to an external electric power supply and a signal generator. Furthermore, the motor frame 2 and the non-load-end end frame 12 each have a cooling water supply port and a drainage port, and one water supply port and the other drainage port are linked by external piping so as to be connected in series.

In this mechanically and electrically integrated module 100, direct-current power that is supplied from an external electric power supply is converted into alternating-current power by the inverter apparatus 40, and is supplied to the stator coil 34. Rotating magnetic fields are thereby generated in the stator 30. Torque is generated by interaction between these rotating magnetic fields of the stator 30 and the magnetic fields from the permanent magnets 22, driving the rotor 20 to rotate, and this torque is outputted by means of the shaft 24.

Cooling water is supplied to the motor cooling flow channel 9 that is built into the frame 4, flows through the motor cooling flow channel 9, is then led to the inverter-cooling flow channel 17 that is built into the non-load-end end frame 12 by means of the external piping, flows through the inverter-cooling flow channel 17, and is then discharged. Thus, heat generated in the stator coil 34 is transferred to the frame 4 by means of the stator core 31, and is radiated to the cooling water that flows through the motor cooling flow channel 9, suppressing temperature increases in the stator 30. Heat generated in the upper arm and lower arm switching elements 53 and 54 of the power modules 41 is transferred to the cooling frame 15, and is radiated to the cooling water that flows through the inverter-cooling flow channel 17, suppressing temperature increases in the power modules 41.

In Embodiment 1, because the recessed grooves 18 are recessed into the outer circumferential surface of the non-load-end end frame 12, the cross-sectional area of the recessed grooves 18 can be enlarged, facilitating passage of the connecting conductors 39. In addition, the non-load-end end frame 12 can be housed in the non-load-end end-frame-holding portion 8 in an internally fitted state with the connecting conductors 39 passed through the recessed grooves 18. Thus, complicated operations such as passing the connecting conductors 39 through a penetrating aperture that has a small diameter are no longer required, facilitating the connecting operation between the alternating-current terminals 48 of the inverter apparatus 40 and the stator coil 34 of the motor 1.

Because a non-load-end coil-end-housing portion 7 that has a larger diameter than that of the stator-core-holding portion 6 is formed on the frame 4 at the non-load end of the stator-core-holding portion 6, a vacant space is formed radially outside the non-load-end coil end of the stator coil 34. Thus, internal connection of the stator coil 34 can be performed using the vacant space in question, simplifying end portion processing of the stator coil 34.

Because the connecting-conductor-guiding grooves 10 are recessed into the inner circumferential surface of the non-load-end coil-end-housing portion 7 so as to have groove directions oriented in an axial direction, leading the connecting conductors 39 to the recessed grooves 18 is facilitated by using the connecting-conductor-guiding grooves 10 as guides, facilitating mounting of the non-load-end end frame 12 onto the non-load-end end-frame-holding portion 8.

Because the six power modules 41 are arranged in a row on the module mounting surface of the cooling frame 15 at a uniform angular pitch in a circumferential direction, the power modules 41, which are heat-generating parts, are distributed circumferentially. Thus, the occurrence of cooling irregularities due to the cooling water that flows through the inverter-cooling flow channel 17 is suppressed, and preventing situations such as the temperatures of some of the power modules 41 rising excessively.

Because the recessed grooves 18 are recessed into the outer circumferential surface of the non-load-end end frame 12, the recessed grooves 18 can be formed without interfering with the inverter-cooling flow channel 17. Thus, the recessed grooves 18 can be formed simply, and so as to have a large groove cross-sectional area, without causing the cooling performance to deteriorate.

Because the recessed grooves 18 are disposed so as to correspond to each of the power modules 41, a single connecting conductor 39 is passed through each of the recessed grooves 18, facilitating the operation of passing the connecting conductors 39 through the recessed grooves 18.

Because the recessed grooves 18 are positioned in circumferential spacing between pairs of adjacent power modules 41, work space for connecting the connecting conductors 39 to the alternating-current terminals 48 of the inverter apparatus 40 is wider, facilitating that connecting operation.

Because the electric current sensors 47 are positioned in circumferential spacing between the pairs of adjacent power modules 41, installation space for the electric current sensors 47 is wider, facilitating installation thereof and connecting operations therefor.

Because the electric current sensors 47 are disposed on the cooling frame 15, cooling of the electric current sensors 47 is improved, enabling the occurrence of detection deviation due to temperature change to be suppressed, and enabling controllability to be improved.

Because the insulating members 38 are plugged into the air gaps that are formed by the non-load-end end-frame-holding portion 8 and the recessed grooves 18, vibration of the connecting conductors 39 in the air gaps is suppressed. Thus, the occurrence of wire breakage of the connecting conductors 39 can be suppressed, and the occurrence of damage to connected portions between the connecting conductors 39 and the stator coil 34 and between the connecting conductors 39 and the alternating-current terminals 48 can be suppressed.

Because the insulating members 38 are plugged into the air gaps that are formed by the non-load-end end-frame-holding portion 8 and the recessed grooves 18, insulating strength in portions that have higher inverter surge voltages can be increased.

Now, in Embodiment 1 above, the material of the upper arm switching elements 53, the lower arm switching elements 54, and the recycling diodes 55 that constitute the power modules 41 is not mentioned, but the upper arm and lower arm switching elements 53 and 54 and the recycling diodes 55 are produced using a semiconductor such as silicon, or a wideband gap semiconductor such as silicon carbide, gallium nitride, etc. If the upper arm and lower arm switching elements 53 and 54 and the recycling diodes 55 are produced using a wideband gap semiconductor such as silicon carbide, gallium nitride, etc., for example, then the cooling water can be made to flow to the inverter-cooling flow channel 17 after flowing through the motor cooling flow channel 9 because wideband gap semiconductors are highly heat-resistant elements. The motor 1 is thereby cooled effectively, enabling downsizing and increased efficiency in the motor 1.

Moreover, in Embodiment 1 above, the recessed grooves are recessed into the outer circumferential surface of the non-load-end end frame, but the recessed grooves may instead be recessed into an inner circumferential surface of a non-load-end end-frame-holding portion.

In Embodiment 1 above, the recessed grooves are recessed only into the outer circumferential surface of the non-load-end end frame, but the recessed grooves may be recessed into the outer circumferential surface of the non-load-end end frame and the inner circumferential surface of the non-load-end end-frame-holding portion so as to face each other. In that case, because the cross-sectional area of the air gaps that are formed by the recessed grooves is increased, the cross-sectional area of the connecting conductors can be enlarged, enabling loss and heat generated in the connecting conductors to be reduced.

In Embodiment 1 above, an insulating resin that has elasticity, such as a silicone rubber, is used in the insulating members, but good thermal conductivity may be increased by filling with a filler, etc. In that case, because heat generated in the connecting conductors is transferred to the cooling frame efficiently, the cooling of the connecting conductors is improved, enabling loss from the connecting conductors to be reduced.

Embodiment 2

Figure 9:
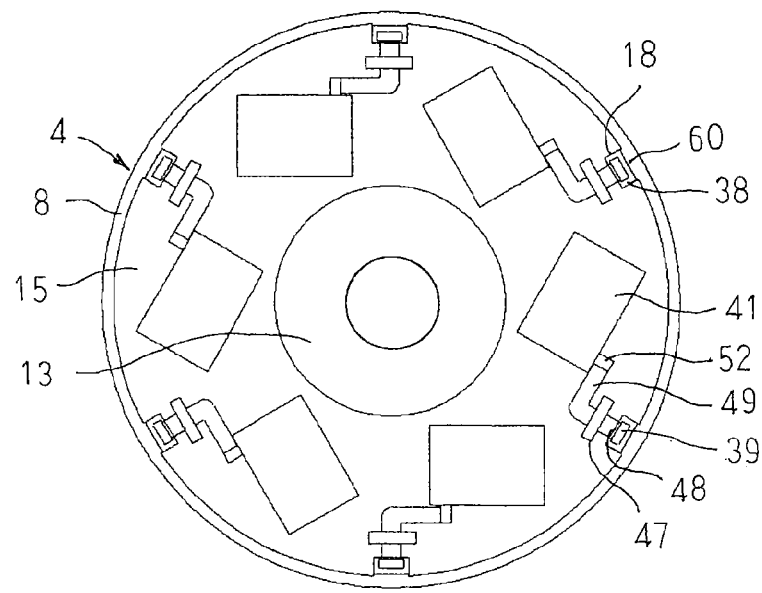
FIG. 9 is a cross section that explains an arranged state of power modules in a mechanically and electrically integrated module according to Embodiment 2 of the present invention.
Figure 10:
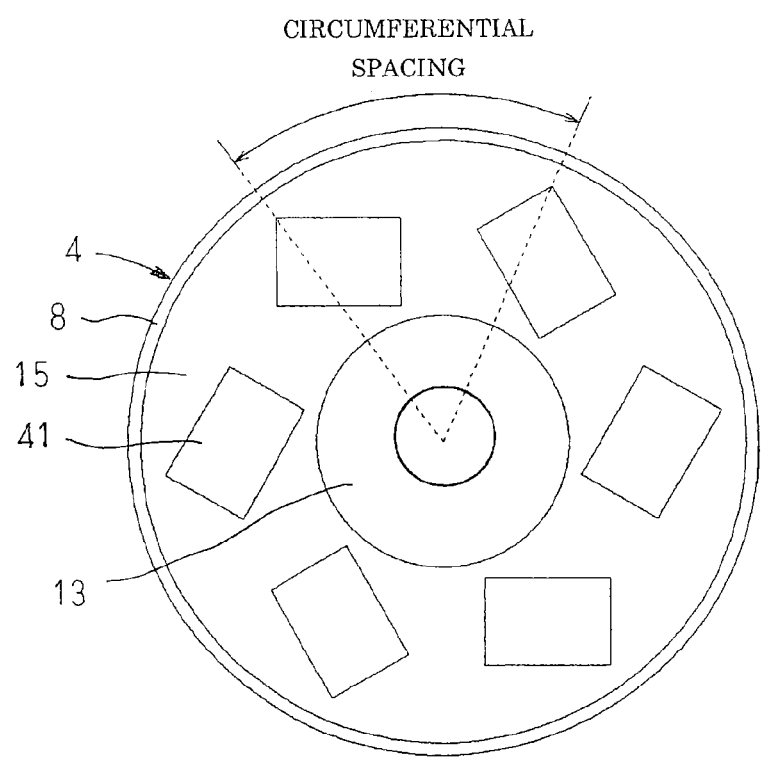
FIG. 10 is a top plan that explains limits of circumferential spacing between the power modules in the mechanically and electrically integrated module according to Embodiment 2 of the present invention.

FIG. 9 is a cross section that explains an arranged state of power modules in a mechanically and electrically integrated module according to Embodiment 2 of the present invention, and FIG. 10 is a top plan that explains limits of circumferential spacing between the power modules in the mechanically and electrically integrated module according to Embodiment 2 of the present invention.

In FIG. 9, six end-frame-positioning protruding portions 60 have a circumferential width that is equal to a groove width of recessed grooves 18, and are disposed on an inner circumferential surface of the non-load-end end-frame-holding portion 8 at a uniform angular pitch in a circumferential direction so as to each extend axially. The end-frame-positioning protruding portions 60 are fitted into each of the recessed grooves 18. Power modules 41 are arranged in a row at a uniform angular pitch in the circumferential direction so as to be inclined asymmetrically relative to radii that pass through centers of the power modules 41.

Moreover, the rest of the configuration is formed in a similar or identical manner to that of Embodiment 1 above.

In Embodiment 2, because the alternating-current terminals 48 of the inverter apparatus 40 and the stator coil 34 of the motor 1 are connected by the connecting conductors 39 that are passed through the recessed grooves 18, similar or identical effects to those in Embodiment 1 above are also exhibited.

According to Embodiment 2, the end-frame-positioning protruding portions 60 are disposed so as to protrude from the inner circumferential surface of the non-load-end end-frame-holding portion 8, and are fitted into each of the recessed grooves 18. Thus, circumferential positioning between the motor frame 2 and the non-load-end end frame 12, in other words, between the motor frame 2 and the inverter apparatus 40, is performed simply without having to use a special positioning mechanism. Furthermore, because the recessed grooves 18 for leading the connecting conductors 39 out to the non-load end are used for positioning between the motor frame 2 and the inverter apparatus 40, it is not necessary to form recessed grooves exclusively for positioning between the motor frame 2 and the inverter apparatus 40 additionally on the non-load-end end frame 12, enabling simplification of the configuration of the non-load-end end frame 12 to be achieved.

Because the power modules 41 are arranged in a row at a uniform angular pitch in the circumferential direction so as to be inclined asymmetrically relative to radii that pass through centers of the power modules 41, the circumferential spacing between the pairs of adjacent power modules 41 is enlarged compared to Embodiment 1 above, as shown in FIG. 10. Thus, the cross-sectional area of the air gaps and the installation area for the electric current sensors 47 is enlarged, facilitating assembly of the mechanically and electrically integrated module.

Moreover, in Embodiment 2 above, end-frame-positioning protruding portions are fitted together with each of the recessed grooves, but the number of end-frame-positioning protruding portions need only be one.

Embodiment 3

Figure 11:
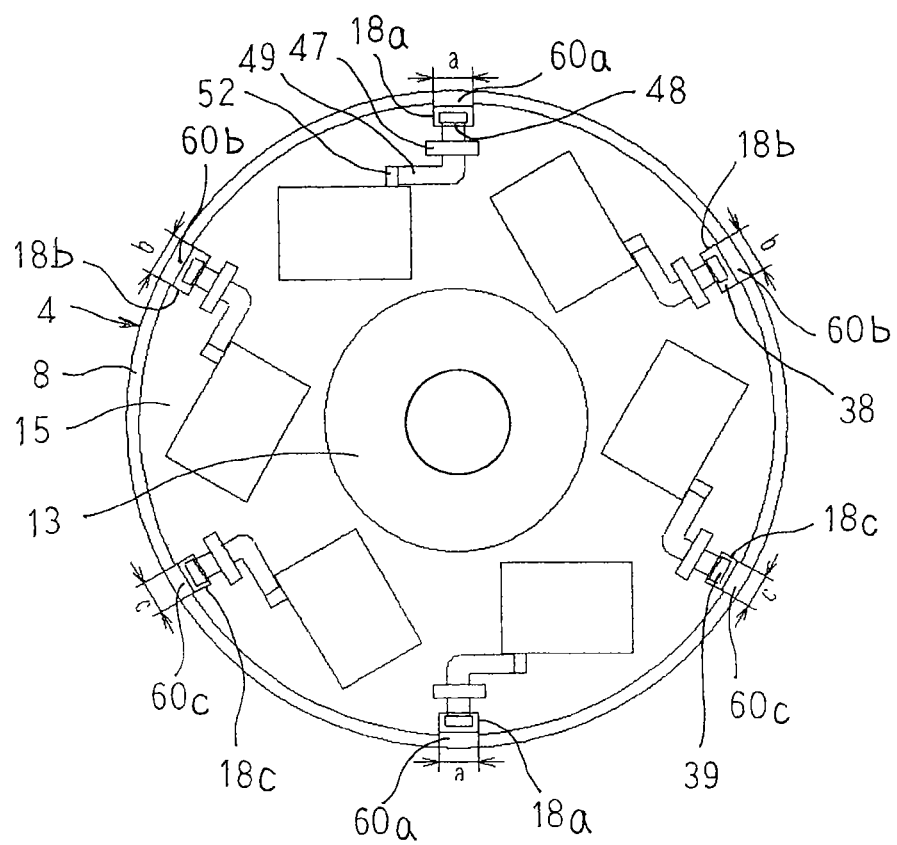
FIG. 11 is a cross section that explains an arranged state of power modules in a mechanically and electrically integrated module according to Embodiment 3 of the present invention.

FIG. 11 is a cross section that explains an arranged state of power modules in a mechanically and electrically integrated module according to Embodiment 3 of the present invention.

In FIG. 11, recessed grooves 18a that have a circumferential groove width of a, recessed grooves 18b that have a circumferential groove width of b, and recessed grooves 18c that have a circumferential groove width of c are recessed into an outer circumferential surface of the non-load-end end frame 12 so as to line up in order of a recessed groove 18a, a recessed groove 18b, a recessed groove 18c, a recessed groove 18a, a recessed groove 18c, and a recessed groove 18b. End-frame-positioning protruding portions 60a that have a circumferential width of a, end-frame-positioning protruding portions 60b that have a circumferential width of b, and end-frame-positioning protruding portions 60c that have a circumferential width of c are disposed so as to protrude from an inner circumferential surface of a non-load-end end-frame-holding portion 8 so as to line up in order of an end-frame-positioning protruding portion 60a, an end-frame-positioning protruding portion 60b, an end-frame-positioning protruding portion 60c, an end-frame-positioning protruding portion 60a, an end-frame-positioning protruding portion 60c, and an end-frame-positioning protruding portion 60b. Here, the widths a, b, and c have a relationship c<a<b.

Moreover, the rest of the configuration is formed in a similar or identical manner to that of Embodiment 2 above.

In Embodiment 3, the end-frame-positioning protruding portions 60a, 60b, and 60c are disposed so as to protrude from the inner circumferential surface of the non-load-end end-frame-holding portion 8, and are fitted into each of the recessed grooves 18a, 18b, and 18c. The power modules 41 are arranged in a row at a uniform angular pitch in the circumferential direction so as to be inclined asymmetrically relative to radii that pass through centers of the power modules 41. Consequently, in Embodiment 3, similar or identical effects to those in Embodiment 2 above are also exhibited.

According to Embodiment 3, the non-load-end end frame 12 is housed and held in the non-load-end end-frame-holding portion 8 by fitting the end-frame-positioning protruding portions 60a, 60b, and 60c together with the recessed grooves 18a, 18b, and 18c. The non-load-end end frame 12 does not have rotational symmetry with respect to the widths of the recessed grooves 18a, 18b, and 18c. Thus, because the rotational position between the motor frame 2 and the inverter apparatus 40 is uniquely determined, it is particularly effective for uses such as where electricity is supplied from power modules 41 that are specific to each of the phase coils.

Moreover, in Embodiment 3 above, the configuration is such that the rotational position between the motor frame and the inverter apparatus is uniquely determined by arranging recessed grooves that have different widths at a uniform angular pitch in a circumferential direction, similar or identical effects are exhibited if recessed grooves that have equal widths are arranged at a nonuniform pitch circumferentially.

Embodiment 4

Figure 12:
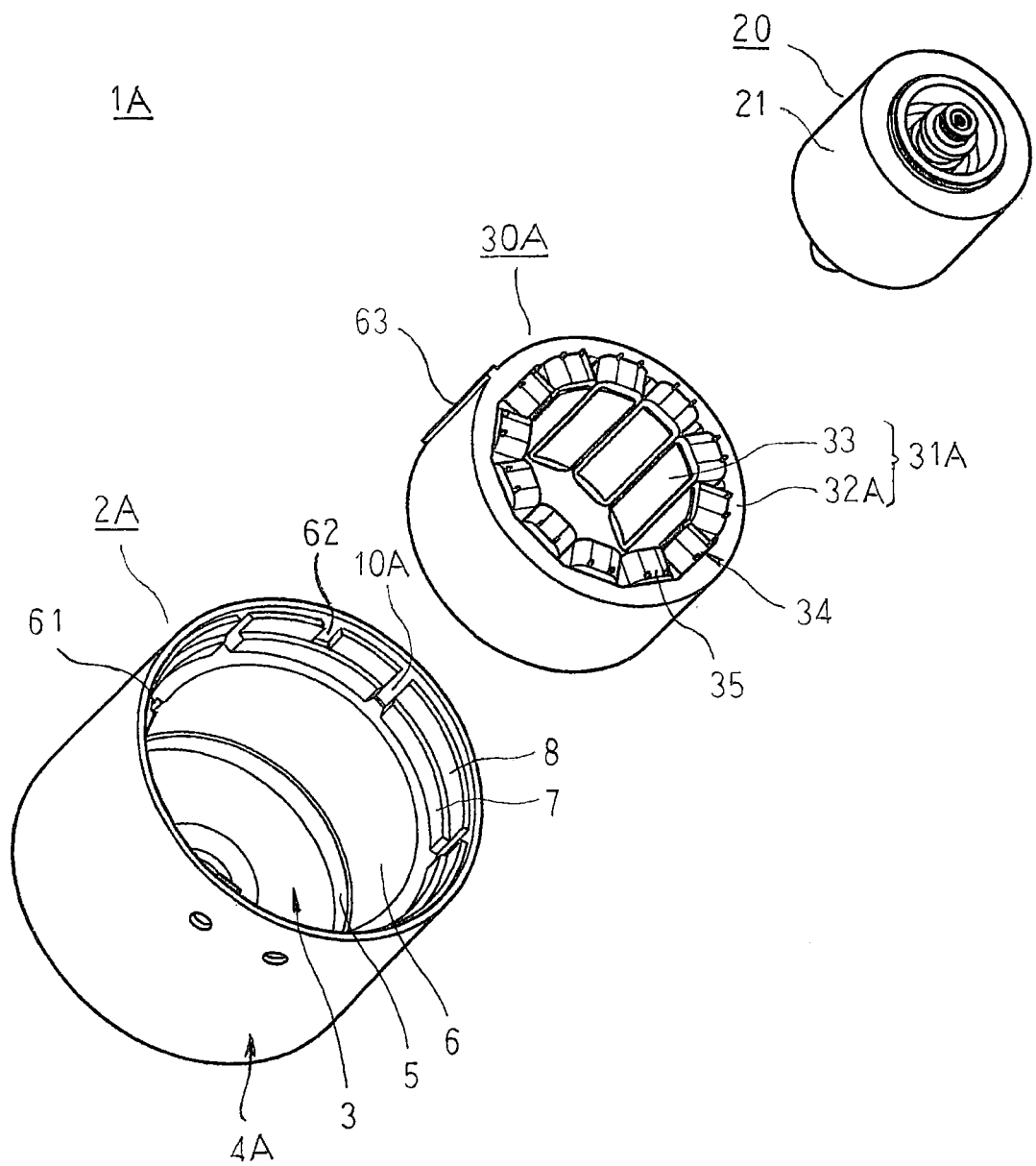
FIG. 12 is an exploded oblique projection that explains a configuration of a motor in a mechanically and electrically integrated module according to Embodiment 4 of the present invention.
Figure 13:
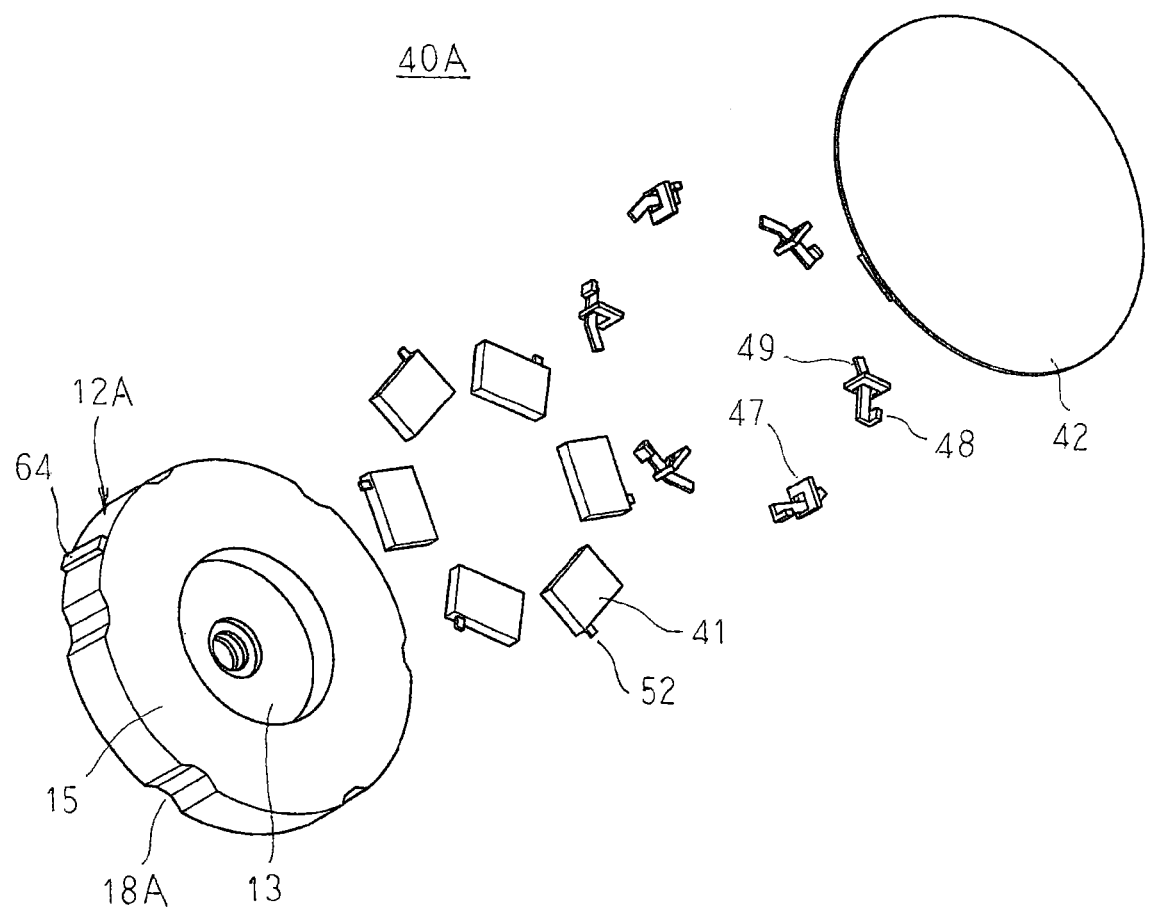
FIG. 13 is an exploded oblique projection that explains a configuration of an inverter apparatus in the mechanically and electrically integrated module according to Embodiment 4 of the present invention.

FIG. 12 is an exploded oblique projection that explains a configuration of a motor in a mechanically and electrically integrated module according to Embodiment 4 of the present invention, and FIG. 13 is an exploded oblique projection that explains a configuration of an inverter apparatus in the mechanically and electrically integrated module according to Embodiment 4 of the present invention.

In FIG. 12, a motor frame 2A is produced into a floored cylindrical shape that has: the disk-shaped load-end end frame 3; and a cylindrical frame 4A that is disposed so as to extend axially from an outer circumferential edge portion of the load-end end frame 3. The frame 4A is formed so as to have an inner circumferential surface shape in which an inside diameter increases successively in a stepped shape from near the load-end end frame 3 toward an opening side (a non-load end). Specifically, the frame 4 is configured such that the load-end coil-end-housing portion 5, the stator-core-holding portion 6, the non-load-end coil-end-housing portion 7, and a non-load-end end-frame-holding portion 8 line up sequentially from a load end toward the non-load end.

Six connecting-conductor-guiding grooves 10A are respectively recessed into inner circumferential surfaces of the non-load-end coil-end-housing portion 7 and the non-load-end end-frame-holding portion 8 so as to have groove directions oriented in an axial direction and so as to be arranged in a row at a uniform angular pitch circumferentially. The connecting-conductor-guiding grooves 10A are formed so as to have a splayed cross-sectional shape in which groove widths widen gradually toward an opening (radially inward), and such that opening widths widen gradually from the load end toward the non-load end. A stator-positioning recessed groove 61 is recessed into an inner circumferential surface of the stator-core-holding portion 6 so as to have a groove direction oriented in an axial direction. An end-frame-positioning recessed groove 62 are recessed into an inner circumferential surface of the non-load-end end-frame-holding portion 8 so as to have a groove direction oriented in an axial direction at a groove width that is wider than opening widths of portions of the connecting-conductor-guiding grooves 10A that are formed on the non-load-end end-frame-holding portion 8.

A stator 30A includes: a stator core 31A that has: an annular core back 32A; and twelve teeth 33 that each protrude radially inward from an inner circumferential surface of the core back 32A, and that are arranged at a uniform angular pitch circumferentially; and a stator coil 34 that is constituted by twelve concentrated winding coils 35 that are produced by winding conductor wires that are coated with an insulator into concentrated windings on the respective teeth 33 so as to have insulators 36 interposed that are produced using an insulating material. A stator-positioning protruding portion 63 has a cross-sectional shape that can fit together with the stator-positioning recessed groove 61, and is formed on an outer circumferential surface of the core back 32A so as to extend from the load end to the non-load end.

In FIG. 13, six recessed grooves 18A are respectively recessed into outer circumferential surfaces of the base portion 13, the partitioning wall 14a, and the cooling frame 15 so as to have a groove direction oriented in an axial direction and so as to be arranged in a row at a uniform angular pitch circumferentially. The recessed grooves 18A are formed so as to have a splayed cross-sectional shape in which groove widths widen gradually toward an opening (radially outward), and such that opening widths widen gradually from the load end toward the non-load end. An end-frame-positioning protruding portion 64 has a cross-sectional shape that can fit together with the end-frame-positioning recessed groove 62, and is formed on outer circumferential surfaces of the base portion 13, the partitioning wall 14a, and the cooling frame 15 so as to face the end-frame-positioning recessed groove 62 so as to extend from the load end to the non-load end.

Moreover, the rest of the configuration is formed in a similar or identical manner to that of Embodiment 1 above.

In Embodiment 4, the stator core 31A of this stator 30A is inserted into the stator-core-holding portion 6 of the frame 4A from the non-load end in an internally fitted state, and is fixed by shrinkage fitting, etc. Here, axial positioning of the stator 30A is achieved by the stator core 31A contacting a step between the load-end coil-end-housing portion 5 and the stator-core-holding portion 6. Circumferential positioning in the stator 30A is achieved by the stator-positioning protruding portion 63 being inserted into the stator-positioning recessed groove 61. The rotor 20 is then inserted inside the stator 30A from the non-load end. Next, although not shown, the internal connection processing (the end portion processing) of the stator coil 34 is performed near a radially outer side of the non-load-end coil end inside the non-load-end coil-end-housing portion 7, and the six connecting conductors 39 are respectively led out axially at the non-load end through the connecting-conductor-guiding grooves 10A.

The six power modules 41 are disposed on the power module mounting surface of the cooling frame 15 at a uniform angular pitch in the circumferential direction, and the electric current sensors 47 are disposed on the power module mounting surface of the cooling frame 15 in the respective circumferential spacing between the power modules 41. The alternating-current conductors 49 are passed through each of the electric current sensors 47, and the first ends thereof are connected to the module alternating-current terminals 52 of the power modules 41, and the second ends are connected to the alternating-current terminals 48. The power-module-driving circuit board 42 onto which the capacitor 46 is mounted is mounted onto the cooling frame 15 using the circuit board supports 45 (not shown), and predetermined connection is performed to assemble an inverter apparatus 40A.

The non-load-end end frame 12A into which the inverter apparatus 40A has been installed is inserted into the non-load-end end-frame-holding portion 8 in an internally fitted state, and the non-load-end end frame 12A and the non-load-end end-frame-holding portion 8 are fixed by shrinkage fitting, etc. Here, circumferential positioning of the non-load-end end frame 12A is achieved by the end-frame-positioning protruding portion 64 being inserted into the end-frame-positioning recessed groove 62. Thus, the circumferential position of the non-load-end end frame 12A is adjusted such that the recessed grooves 18A face the connecting-conductor-guiding grooves 10A axially, and the non-load-end end frame 12 is inserted into the non-load-end end-frame-holding portion 8 such that the connecting conductors 39 that pass through the connecting-conductor-guiding grooves 10A and are led out axially at the non-load end are inserted into the recessed grooves 18A. The connecting conductors 39 are led out to the non-load end so as to pass through the air gaps that are formed by the connecting-conductor-guiding grooves 10A and the recessed grooves 18A. Here, axial positioning of the non-load-end end frame 12A is achieved by the non-load-end end frame 12A contacting a step between the non-load-end coil-end-housing portion 7 and the non-load-end end-frame-holding portion 8.

Next, the insulating members 38 (not shown) are pushed from the non-load end into the air gaps that are formed by the connecting-conductor-guiding grooves 10A and the recessed grooves 18A with the connecting conductors 39 (not shown) passed through the connecting conductor insertion apertures 38a. Next, end portions of the connecting conductors 39 that are led out at the non-load end are cut, and the cut ends thereof are connected to the alternating-current terminals 48 by screws, etc. In addition, the protective cover 43 (not shown) is mounted from the non-load end so as to cover the inverter apparatus 40A, and is fixed to the non-load-end end frame 12A by a screw, etc., to assemble a mechanically and electrically integrated module that is constituted by a motor 1A and the inverter apparatus 40A.

According to Embodiment 4, the stator-positioning recessed groove 61 is formed on the inner circumferential surface of the stator-core-holding portion 6 of the frame 4A, and the stator-positioning protruding portion 63 is formed on the outer circumferential surface of the core back 32A of the stator core 31A so as to be able to fit together with the stator-positioning recessed groove 61. Thus, by fitting the stator-positioning protruding portion 63 into the stator-positioning recessed groove 61 when mounting the stator 30A into the frame 4A, the stator 30A can be installed in the frame 4A in a positioned state in a direction of rotation.

The end-frame-positioning recessed groove 62 is formed on the inner circumferential surface of the non-load-end end-frame-holding portion 8 of the frame 4A, and the end-frame-positioning protruding portion 64 is formed on the outer circumferential surfaces of the base portion 13, the partitioning wall 14a, and the cooling frame 15 so as to be able to fit together with the end-frame-positioning recessed groove 62. Thus, by fitting the end-frame-positioning protruding portion 64 into the end-frame-positioning recessed groove 62 when mounting the stator 30A the non-load-end end frame 12A onto the frame 4A, the non-load-end end frame 12A can be installed in the frame 4A in a positioned state in the direction of rotation. The positions of the motor frame 2A and the inverter apparatus 40A in the direction of rotation are thereby uniquely determined. Thus, the positions of the stator 30A and the alternating-current terminals 48 of the inverter apparatus 40A in the direction of rotation are uniquely determined, simplifying connecting work between the connecting conductors 39 and the alternating-current terminals 48.

Because the circumferential width of the end-frame-positioning protruding portion 64 is formed so as to be wider than the opening width of the non-load end of the connecting-conductor-guiding grooves 10A, the end-frame-positioning protruding portion 64 will not be inserted into the connecting-conductor-guiding grooves 10A when mounting the non-load-end end frame 12A onto the frame 4A, improving assembly between the non-load-end end frame 12A and the frame 4A.

The connecting-conductor-guiding grooves 10A and the recessed grooves 18A are formed so as to have splayed groove cross-sectional shapes. Thus, the connecting conductors 39 that are led out to the non-load end so as to pass through the connecting-conductor-guiding grooves 10A when mounting the non-load-end end frame 12A onto the frame 4A can simply be inserted into the recessed grooves 18A. In addition, the connecting conductors 39 follow the inner wall surfaces of the splayed shapes of the connecting-conductor-guiding grooves 10A and the recessed grooves 18A and are accommodated inside the air gaps that are formed by the connecting-conductor-guiding grooves 10A and the recessed grooves 18A in the step of inserting the non-load-end end frame 12A into the non-load-end end-frame-holding portion 8, performing positioning of the connecting conductors 39. Consequently, it is not necessary to manage the outlet positions of the connecting conductors 39 from the stator 30A toward the non-load end with high precision. In addition, the connecting conductors 39 contact the base portions 13 and are deflected when the non-load-end end frame 12A is inserted into the non-load-end end-frame-holding portion 8, suppressing the occurrence of problems such as being unable to be inserted into the recessed grooves 18A.

Because the opening widths of the connecting-conductor-guiding grooves 10A and the recessed grooves 18A are formed so as to widen gradually from the load end toward the non-load end, the insulating members 38 are easily inserted from the non-load end into the air gaps that are formed by the connecting-conductor-guiding grooves 10A and the recessed grooves 18A after the non-load-end end frame 12A is mounted onto the frame 4A. Here, from a viewpoint of improving insertion into the air gaps in question from the non-load end, it is preferable that the insulating members 38 have a cross-sectional shape that conforms to the opening shape of the air gaps that are formed by the connecting-conductor-guiding grooves 10A and the recessed grooves 18A, and be configured into a tapered shape that becomes gradually smaller toward the load end from the non-load end.

Moreover, in Embodiment 4 above, a stator-positioning recessed groove is formed on an inner circumferential surface of a stator-holding portion, and a stator-positioning protruding portion is formed on an outer circumferential surface of a core back of a stator core, but a stator-positioning protruding portion may be formed on an inner circumferential surface of a stator-holding portion, and a stator-positioning recessed groove formed on an outer circumferential surface of a core back of a stator core. Furthermore, stator-positioning recessed grooves may be formed on an inner circumferential surface of a stator-holding portion and an outer circumferential surface of a core back, and positioning of the frame and the stator in the direction of rotation may be performed by making the two stator-positioning recessed grooves face each other, and inserting a key inside an air gap that is formed by the two stator-positioning recessed grooves.

In Embodiment 4 above, one stator-positioning recessed groove and one stator-positioning protruding portion are formed on an inner circumferential surface of a stator-holding portion and an outer circumferential surface of a core back, but there may be a plurality of pairs of stator-positioning recessed grooves and stator-positioning protruding portions. In that case, it is preferable that the plurality of pairs of stator-positioning recessed grooves and stator-positioning protruding portions be formed such that either circumferential spacing between the pairs, or indentations and protrusions of the respective pairs, are rotationally asymmetrical such that positions of the frame and the stator in the direction of rotation are determined uniquely.

In Embodiment 4 above, an end-frame-positioning recessed groove is formed on an inner circumferential surface of a non-load-end end-frame-holding portion, and an end-frame-positioning protruding portion is formed on outer circumferential surfaces of a non-load-end end frame (a base portion, a partitioning wall, and a cooling frame), but an end-frame-positioning protruding portion may be formed on an inner circumferential surface of a non-load-end end-frame-holding portion, and an end frame recessed groove formed on an outer circumferential surface of a core back of a non-load-end end frame.

In Embodiment 4 above, one end-frame-positioning recessed groove and one end-frame-positioning protruding portion are formed on an inner circumferential surface of an end-frame-holding portion and an outer circumferential surface of a non-load-end end frame, but there may be a plurality of pairs of end-frame-positioning recessed grooves and end-frame-positioning protruding portions. In that case, it is preferable that the plurality of pairs of end-frame-positioning recessed grooves and end-frame-positioning protruding portions be formed such that either circumferential spacing between the pairs, or indentations and protrusions of the respective pairs, are rotationally asymmetrical such that positions of the motor frame and the non-load-end end frame in the direction of rotation are determined uniquely.

In Embodiment 4 above, connecting-conductor-guiding grooves and recessed grooves are formed so as to have groove shapes in which groove widths thereof widen gradually from a load end toward a non-load end, but connecting-conductor-guiding grooves and recessed grooves may be formed so as to have groove shapes in which groove depths thereof becomes gradually deeper from the load end toward the non-load end. Furthermore, connecting-conductor-guiding grooves and recessed grooves may be formed so as to have groove shapes in which groove widths and groove depths become gradually larger from the load end toward the non-load end.

In Embodiment 4 above, connecting-conductor-guiding grooves and recessed grooves are formed so as to have splayed cross-sectional shapes, but one of the connecting-conductor-guiding grooves and recessed grooves may be formed so as to have a splayed cross-sectional shape, and the other formed so as to have a rectangular cross-sectional shape. Furthermore, provided that air gaps for leading the connecting conductors out to the non-load end are formed, one of the connecting-conductor-guiding grooves and recessed grooves may be formed so as to have a splayed cross-sectional shape, and the other grooves omitted, or projections may be formed instead of the other grooves.

In Embodiment 4 above, a single insulating member is disposed in each of the air gaps that is formed by the connecting-conductor-guiding grooves and the recessed grooves, but the insulating members may be divided in two, such that first insulating members are disposed in non-load-end coil-end-housing portion groove portions of the connecting-conductor-guiding grooves, and second insulating members are disposed inside air gaps that are formed by non-load-end end-frame-holding-portion groove portions of the connecting-conductor-guiding grooves and the recessed grooves. In that case, the stator-core-holding portion of the frame is fitted into the stator, and then the first insulating members are pushed into the non-load-end coil-end-housing-portion groove portions of the connecting-conductor-guiding grooves while passing the connecting conductors that are were led out through the connecting-conductor-guiding grooves to the non-load end through the connecting conductor insertion apertures. Next, the non-load-end end frame in which the second insulating members are pushed into the recessed grooves is fitted into the non-load-end end-frame-holding portion of the frame. Here, the non-load-end end frame is moved toward the load end and is fitted into the non-load-end end-frame-holding portion of the frame while passing the connecting conductors through connecting conductor insertion apertures on the second insulating members. Situations such as the connecting conductors rubbing against inner circumferential surfaces of the connecting-conductor-guiding grooves and the recessed grooves and damaging insulating coatings that are coated onto outer circumferential surfaces of the connecting conductors are thereby avoided, enabling deterioration of insulation performance to be suppressed.

Moreover, in each of the above embodiments, cases in which a motor is used as a rotary electric machine have been explained, but an alternator or an alternating-current generator-motor may be used as the rotary electric machine.

In each of the above embodiments, the number of poles in the motor 1 is ten, and the number of slots is twelve, but the number of poles and the number of slots are not limited thereto.

In each of the above embodiments, power modules are arranged in a row on a module mounting surface of a cooling frame at a uniform angular pitch in a circumferential direction, but it is not absolutely necessary for the power modules to be arranged at a uniform angular pitch circumferentially, and they need only be arranged so as to be distributed circumferentially.

In each of the above embodiments, water is used as a refrigerant, but the refrigerant is not limited to water, and oil or antifreeze may be used, for example.

In each of the above embodiments, the number of power modules is set to six, in other words, six power modules that each correspond to driving of a single phase portion are used, but the number of power modules is not limited thereto. If a single three-phase alternating-current winding is configured by wye-connecting three phase coils that are each produced by connecting four concentrated winding coils in parallel, for example, then twelve power modules may be used so as to have one-to-one correspondence with the concentrated winding coils. In that case, connecting conductors that have a small cross-sectional area can be used, simplifying the operation of leading the connecting conductors around, and also simplifying the internal connection operation of the stator coil.

The invention claimed is:
1. A mechanically and electrically integrated module comprising:
    a rotary electric machine that comprises:
        a housing that includes:
            a cylindrical frame;
            a load-end end frame that is disposed on a first axial end of said cylindrical frame; and
            a non-load-end end frame that is disposed on a second axial end of said cylindrical frame, and into which a cooling flow channel is built;
        a stator that includes:
            an annular stator core that is housed and held in said cylindrical frame in an internally fitted state; and
            a stator coil that is mounted onto said stator core; and a rotor that is rotatably supported by said load-end end frame and said non-load-end end frame so as to be disposed on an inner circumferential side of said stator; and an inverter apparatus that includes:
  power modules that are disposed on an opposite side of said non-load-end end frame from said load-end end frame; and
  a power-module-driving circuit,
wherein:
said cylindrical frame includes:
  a non-load-end end-frame-holding portion that is formed by enlarging an inside diameter of a non-load-end end portion thereof, and that houses and holds said non-load-end end frame in an internally fitted state; and
  a stator-core-holding portion that is formed at a load end of said non-load-end end-frame-holding portion so as to have a smaller diameter than said non-load-end end-frame-holding portion, and that houses and holds said stator core in an internally fitted state;
a recessed groove that has a groove direction in an axial direction is recessed into at least one of an outer circumferential surface of said non-load-end end frame and an inner circumferential surface of said non-load-end end-frame-holding portion; and
said stator coil and an alternating-current terminal of said inverter apparatus are connected by a connecting conductor that is passed through said recessed groove.

2. The mechanically and electrically integrated module according to claim 1, wherein:
said cylindrical frame further comprises an inside-diameter-expanded portion that is formed by enlarging an inside diameter of said stator-core-holding portion near a non-load end; and
said stator coil is internally connected at said inside-diameter-expanded portion.

3. The mechanically and electrically integrated module according to claim 1, wherein:
said power modules are disposed on a surface of said non-load-end end frame on an opposite side from said load-end end frame so as to line up circumferentially; and
recessed grooves are formed so as to correspond to each of said power modules.

4. The mechanically and electrically integrated module according to claim 3, wherein each of said recessed grooves is disposed in circumferential spacing between pairs of said power modules that are circumferentially adjacent.

5. The mechanically and electrically integrated module according to claim 4, further comprising electric current sensors that are disposed in said circumferential spacing between said pairs of circumferentially adjacent power modules.

6. The mechanically and electrically integrated module according to claim 3, wherein said power modules are disposed on a surface of said non-load-end end frame on an opposite side from said load-end end frame so as to be distributed circumferentially so as to be inclined asymmetrically relative to radii that pass through centers thereof.

7. The mechanically and electrically integrated module according to claim 1, wherein an insulating member is plugged into said recessed groove such that said connecting conductor is held by said non-load-end end frame and said non-load-end end-frame-holding portion.

8. The mechanically and electrically integrated module according to claim 1, further comprising:
  an end-frame-positioning groove that is recessed into a first of said outer circumferential surface of said non-load-end end frame and said inner circumferential surface of said non-load-end end-frame-holding portion; and
  an end-frame-positioning projection that is disposed so as to protrude from a second of said outer circumferential surface of said non-load-end end frame and said inner circumferential surface of said non-load-end end-frame-holding portion so as to fit into said end-frame-positioning groove.

9. The mechanically and electrically integrated module according to claim 8, wherein said recessed groove functions as said end-frame-positioning groove.

10. The mechanically and electrically integrated module according to claim 1, wherein a groove width of said recessed groove widens gradually from a groove bottom portion toward a groove opening.

11. The mechanically and electrically integrated module according to claim 1, wherein at least one of a groove width and a groove depth of said recessed groove increases gradually from said load end toward said non-load end.

* * * * *